United States Patent
Angeli

(10) Patent No.: US 10,689,764 B1
(45) Date of Patent: Jun. 23, 2020

(54) THERMAL INTERFERENCE FIT ANODE ASSEMBLY FOR CATHODIC PROTECTION

(71) Applicant: The United States of America as represented by the Secretary of the Navy, Newport, RI (US)

(72) Inventor: Robert J Angeli, Portsmouth, RI (US)

(73) Assignee: The United States of America as represented by the Secretary of the Navy

( * ) Notice: Subject to any disclaimer, the term of this patent is extended or adjusted under 35 U.S.C. 154(b) by 366 days.

(21) Appl. No.: 15/901,917

(22) Filed: Feb. 22, 2018

(51) Int. Cl.
*C23F 13/10* (2006.01)

(52) U.S. Cl.
CPC .......... *C23F 13/10* (2013.01); *C23F 2213/20* (2013.01)

(58) Field of Classification Search
CPC ....................................................... C23F 13/10
See application file for complete search history.

(56) References Cited

U.S. PATENT DOCUMENTS

| | | | | |
|---|---|---|---|---|
| 4,039,417 A | * | 8/1977 | Sasaki | C23F 13/02 204/196.31 |
| 4,140,613 A | * | 2/1979 | Inoue | F24H 9/0005 174/152 GM |

* cited by examiner

*Primary Examiner* — Brian W Cohen
(74) *Attorney, Agent, or Firm* — James M. Kasischke; Michael P. Stanley

(57) ABSTRACT

A mounting bolt and sacrificial anode assembly is provided. The zinc anode is cylindrical while the mounting bolt is made from aluminum alloy and is machine threaded with an anodized bolt head resting on an anodized bolt head shoulder having two faces with one face being non-anodized. For assembly, the anode is heated to a uniform temperature of approximately two hundred degrees Fahrenheit and the mounting bolt is cooled to approximately zero degrees Fahrenheit after a minimum of six hours and preferably twenty-four hours. The anode is then hand pressed onto the mounting bolt to bottom out on the non-anodized face in order to form a single fused assembly.

6 Claims, 2 Drawing Sheets

THERMAL INTERFERENCE FIT ANODE ASSEMBLY FOR CATHODIC PROTECTION

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention is a mounting bolt and sacrificial anode assembly that provides cathodic protection for fuel tanks that may be backfilled with seawater during operational purposes. (2) Description of the Prior Art Fuel tanks have a history of corroding rapidly and requiring repairs that are costly and frequent. A major cause of leaks in fuel tanks is corrosion.

One material used for fuel tanks is aluminum alloy. Aluminum alloy (AA7175) has a favorable strength-to-weight ratio but there may be issues with corrosion resistance in the presence of seawater. Alternatively, aluminum alloy (AA6061) has enhanced corrosion resistance although with an occasional unacceptable compromise in weight.

Cathodic protection anodes are the most effective when the chemical composition and galvanic potential of the mounting hardware material is as proximate as possible to the cathodically protected material. For fuel tanks, AA 7075 mounting bolts which are identical in galvanic potential are proximate to the AA 7175 tank. Mounting bolts are easily made of AA 7075 bar stock; whereas, the tanks are made of AA 7175 used for extrusion and forging.

Additionally, welding a zinc anode to 7000 series aluminum is difficult. Furthermore, the heat from the weld changes the temper of the aluminum; thereby altering the corrosion resistance and mechanical properties of the anode and mounting bolt assembly.

Machining threads into the zinc anode is very difficult if not impossible to achieve. While the anodes could be cast with the threads in place; this would result in excessive cost in smaller quantity applications due to the need of a custom mold. Even then, the problem of subpar electrical contact would still persist.

As such, there is a continuing need for material options for use with a fuel tank in which the options provide a favorable combination of corrosion resistance and mechanical properties. This need can be addressed by the use of cathodic protection anodes which can be minimized in size to be cost-effective but with a maximized contact area that effectively maximizes needed electrical conductivity.

SUMMARY OF THE INVENTION

Accordingly, it is a general purpose and primary object of the present invention to provide a mounting bolt and sacrificial anode assembly that permits the use of an aluminum alloy with a sufficient strength-to-weight ratio that does not sacrifice corrosion resistance.

It is a further purpose of the present invention to provide a mounting bolt and anode assembly that mitigates seawater induced corrosion in a fuel tank.

To attain the objects of the present invention, a mounting bolt and anode are formed to be a single assembly wherein the anode is fused to a mounting bolt by a shrink fit process. This shrink fit process comprises subjecting the mounting bolt to a temperature of approximately zero degrees Fahrenheit and subjecting the anode to a temperature of approximately two hundred and twenty degrees Fahrenheit. The mounting bolt, with a greater shank diameter than an inside diameter of the cylindrical anode, is subject to the low temperature for a minimum of six hours and preferably twenty-four hours to ensure a uniform temperature distribution. The thermally expanded anode is hand press fit to a shoulder face of the thermally contracted mounting bolt. The resulting thermal contraction of the anode and expansion of the mounting bolt shank leads to permanent fusion of the anode and the mounting bolt.

BRIEF DESCRIPTION OF THE DRAWINGS

Other objects, features and advantages of the present invention will be better understood by means of a detailed description of the drawings that illustrate the principals of the present invention in which.

DETAILED DESCRIPTION OF THE INVENTION

Figure 2:
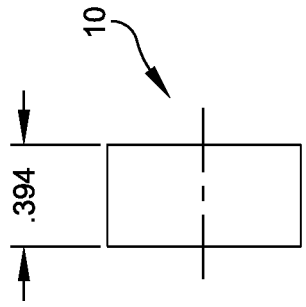
FIG. 2 depicts a side view of the anode with the view taken from reference arrows 2-2 of FIG. 1.
Figure 1:
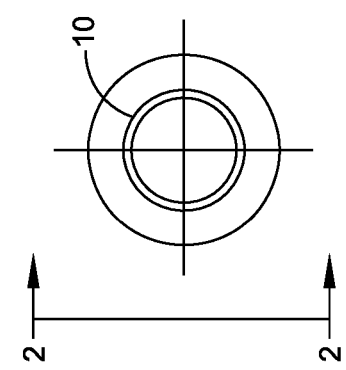
FIG. 1 depicts an anode of the present invention.

Referring now to the drawings, and more particularly to FIG. 1 and FIG. 2, an anode 10 of the present invention is shown. The anode 10 is preferably made from a round bar stock of zinc. The anode 10 is formed as a cylinder or ring with an outside diameter of approximately 0.75 inches and an inside diameter in the range of 0.4048-0.4051 inches with the based on machining abilities in regard to the anode. The length of the anode 10 is approximately four tenths of an inch.

Figure 4:
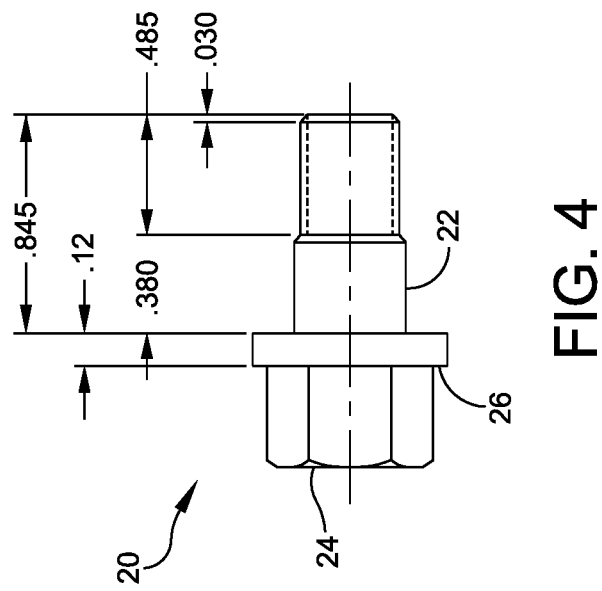
FIG. 4 depicts a side view of the mounting bolt with the view taken from reference arrows 4-4 of FIG. 3.
Figure 3:
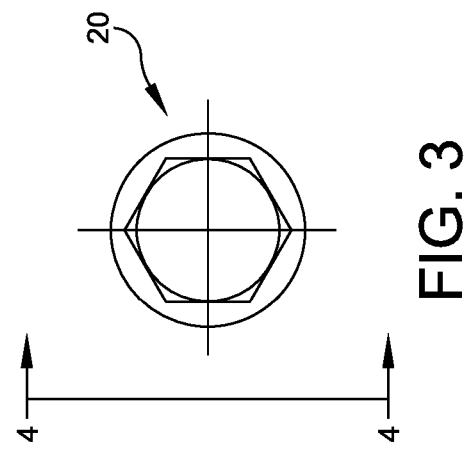
FIG. 3 depicts a mounting bolt of the present invention.

In FIG. 3 and FIG. 4, a mounting bolt 20 of the present invention is shown. The mounting bolt 20 is preferably made from aluminum alloy 7075-T7351 and is machine threaded along a bare aluminum bolt shank 22 with a bolt head 24 resting on a bolt head shoulder 26. The bolt head 24 is hard coat anodized and dichromate sealed for corrosion protection. The bolt head shoulder 26 is mostly hard coat anodized and dichromate sealed except for a face 27 of the bolt head shoulder that is adjacent to the bolt shank 22. The adjacent face 27 is not anodized. The mounting bolt 22 is selectively anodized to ensure optimal performance in terms of electrical contact and corrosion protection. The bolt shank 22 is fully bare aluminum for proper conductivity.

The diameter of the bolt head shoulder 26 is approximately seven tenths of an inch with the length of the bolt head 24 and bolt head shoulder being a half inch overall. The diameter of the unthreaded portion of the bolt shank 22 is in the range of 0.4056-0.4059 inches. The parameters for the anode 10 and the mounting bolt 20 can be scaled in size and in proportion to each other as required.

For assembly, the anode 10 is heated to a uniform temperature of approximately two hundred degrees Fahrenheit. The anode temperature can be measured directly or indirectly by a measurement of the direct heat source.

Figure 5:
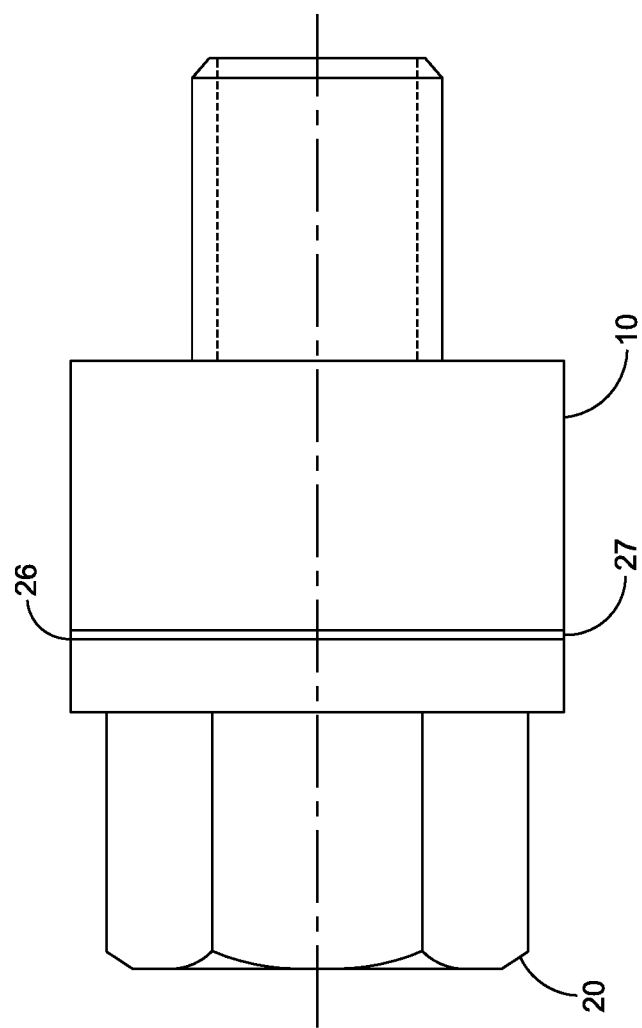
FIG. 5 depicts an assembly of the anode and the mounting bolt.

At close to the same time, the mounting bolt 20 is cooled to approximately zero degrees Fahrenheit after a minimum of six hours and preferably twenty-four hours. The anode 10 is immediately fused to the mounting bolt 20 by hand pressing the anode onto the mounting bolt 20 with the anode in contact or bottoming out on the face 27. The resulting thermal contraction of the anode 10 and expansion of the mounting bolt shank 22 leads to permanent fusion of the anode and the mounting bolt. The assembled anode 10 and mounting bolt 20 is shown in FIG. 5.

A key feature of the present invention is the thermal shrink fit process of the anode 10 and the mounting bolt 20 in order to form a single assembly. Once assembled, the anode 10 and the mounting bolt 20 will remain at the same temperature in service. As such, there is no reasonable way that the anode 10 and the mounting bolt 20 could subsequently separate due to large individual temperature variations.

The novel anode and mounting bolt assembly provides superior electrical conductivity and superior anode efficacy while still providing for comparatively fast and non-destructive installation and removal. This is because the fit of the fused assembly of the anode 10 and the mounting bolt 20 achieved maximizes electrical conductivity by maximizing surface area via the interference fit. Assemblies in which the anode and the mounting bolt are welded or bolted into place cannot achieve this maximum electrical conductivity. As such, the resulting fused assembly of the anode 10 and the mounting bolt 20 provides a superior and reliable cathodic protection.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A mounting bolt and sacrificial anode assembly for use with a fuel tank, said assembly comprising;
   a cylindrical anode with a first end and a second end; and
   a mounting bolt with a first end and a second end, said mounting bolt having a threaded shank proximate to the first end, a non-threaded shank adjacent and integral to said threaded shank with an anodized circular shoulder having a non-anodized first face cast to said non-threaded shank on an end opposite to where said non-threaded shank is adjacent to said threaded shank and an anodized hexagonal bolt head resting on a second face of said circular shoulder;
   wherein said anode is fused to said mounting bolt after heating said anode to a uniform temperature of approximately two hundred degrees Fahrenheit and cooling said mounting bolt to approximately zero degrees Fahrenheit for at least six hours then pressing said anode onto said mounting bolt with said anode bottoming out on the first face of said shoulder such that said anode is fused to said mounting bolt; and
   wherein the resulting fused assembly is capable of use for cathodic protection.

2. The assembly in accordance with claim 1 wherein said anode is zinc and said mounting bolt is cooled for twenty-four hours.

3. The assembly in accordance with claim 2 wherein said cylindrical anode has an outside diameter of approximately 0.750 inches and an inside diameter in the range of 0.4048-0.4051 inches; and
   wherein said non-threaded shank has an outside diameter in the range of 0.4056-0.4059 inches.

4. The assembly in accordance with claim 3 wherein a diameter of said bolt head shoulder is approximately seven tenths of an inch with a length of said bolt head and said bolt head shoulder being half of an inch overall.

5. The assembly in accordance with claim 4 wherein a length of said anode is approximately four tenths of an inch from the first end to the second end of said anode.

6. The assembly in accordance with claim 5 wherein said mounting bolt is aluminum alloy 7075-T7351.

* * * * *